July 3, 1934.  E. DE H. CALDWELL ET AL  1,965,406
MEANS FOR STABILIZING REVERSE GEARS
Filed Nov. 29, 1927
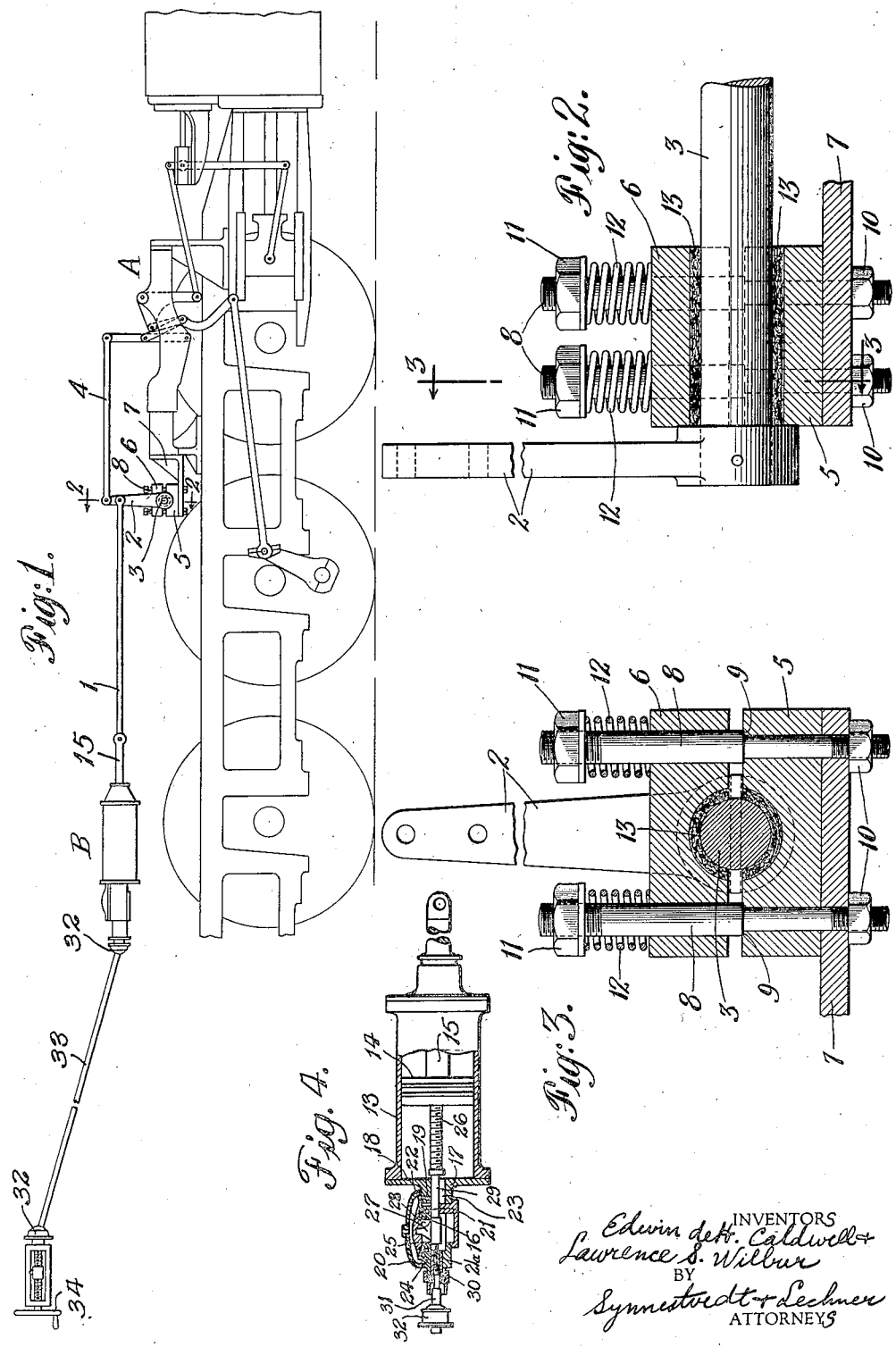
INVENTORS
Edwin de H. Caldwell &
Lawrence S. Wilbur
BY
Synnestvedt & Lechner
ATTORNEYS Patented July 3, 1934

1,965,406

UNITED STATES PATENT OFFICE 1,965,406

MEANS FOR STABILIZING REVERSE GEARS

Edwin de H. Caldwell, Fredonia, N. Y., and Lawrence S. Wilbur, Evanston, Ill., assignors to Franklin Railway Supply Company, New York, N. Y., a corporation of Delaware Application November 29, 1927, Serial No. 236,403

8 Claims. (Cl. 121—162)

This invention relates to means for stabilizing reverse gears particularly power reverse gears such as are commonly used on locomotives.

The more important objects of the invention are the elimination of "creeping" in such gears with the obvious disadvantages incident thereto and the elimination of short reciprocations which are set up by the movements of the valve gear.

How the foregoing together with other objects and advantages are obtained will be clear from the following description considered in connection with the accompanying drawing which illustrates a preferred embodiment of the invention.

In the drawing, Fig. 1 is a fragmentary view of the running gear of a locomotive showing its reverse and valve gears and the stabilizing means of the present invention applied thereto;

Fig. 2 is a cross-sectional view of one of the tumbling or reverse shaft bearings taken as indicated by the line 2—2 of Fig. 1, the view being on an enlarged scale;

Fig. 3 is a sectional view taken on the line 3—3 of Fig. 2; and

Fig. 4 is a vertical sectional view on an enlarged scale through the reverse gear included in the showing of Fig. 1.

Referring now to the drawing it will be seen that we have illustrated the invention as applied to a locomotive which is equipped with a Baker type valve gear and a precision type reverse gear. It is to be understood, however, that the invention may be used with any type of reverse gear or valve gear (such a reverse gear mechanism is illustrated and described in Roberts Patent No. 1,500,685; and such valve gear mechanisms are illustrated on pages 494 to 506 inclusive, of which pages 503 and 504 shows the Baker type, of the Locomotive Cyclopedia for 1925).

The valve gear is indicated as a whole by the reference letter A and the reverse gear by the letter B. The reach rod 1 is connected to the reverse or tumbling shaft arm 2 which is keyed to or cast integral with the tumbling shaft 3. The arm 2 is connected to the valve gear by the rod 4.

The reverse gear, as shown in Figure 4, includes a cylinder 13 in which piston 14 is reciprocable, the piston carrying a trunk or rod 15 projecting out of one end of the cylinder for connection with the reach rod 1. At the other end, the cylinder 13 carries valve mechanism including a valve seat 16 formed on the support 17 which is carried on the end closure member 18 for the cylinder 13. The seat 16 has a port 19 therein through which fluid under pressure may be supplied to the interior of the valve chamber 20. Exhaust ports 21 and 21a are also formed in the seat and a port 22 serves for admission and exhaust of fluid pressure to and from the left end of the cylinder 13. It should be observed that this last port communicates with the left end of the cylinder through the central cavity 23. A port 24 is extended to the right end of the cylinder and the valve member 25 serves to control admission and exhaust of fluid pressure to and from opposite ends of the cylinder so as to control movements of the piston 14.

For the purpose of actuating valve 25, a lead screw 26 may be threaded into the piston 14, as clearly shown, and extended rearwardly through cavity 23 for connection with the valve by means of arm 27 projecting upwardly through a central aperture 28 formed in the valve seat. The actuating finger or arm 27 is mounted on the stem or extension 29 of the lead screw in such manner as to prevent axial movement with respect to the stem 29 but to permit rotation of the stem and screw without turning the valve actuating member 27. For purposes of adjustment, the rear terminal portion 30 of stem 29 is squared and this squared shaft is received in a similarly configured opening in the rotatable member 31. Member 31 is connected, as by means of universal joints 32—32 and rod 33, with the manually operable control element 34.

The reverse gear mechanism described just above is illustrative of the type in which fluid pressure on opposite sides of a piston serves normally to retain the gear in its adjusted position and, in the operation of the gear illustrated, upon rotation of the operating element 34, the shaft member 31 is correspondingly rotated, as is also the stem 29 and lead screw 26, by virtue of the squared connection 30. The connection 30, of course, serves as a slip-joint whereby the lead screw 26 and its stem 29 may have axial movement independent of the rotating part 31. Thus, upon rotation of the manually operable element 34, the axial movement of the stem 29 caused by turning of the screw 26 in the piston head, causes the valve 25 to be moved in a corresponding direction.

To consider the operation further, assume that the valve is moved to the right as viewed in Figure 4. Such movement serves to interconnect passage 22 with port 21 and thus permits exhaust of fluid pressure from the left end of cylinder 13. At the same time this movement uncovers port 24 and therefore permits flow of the operating medium from the supply port 19 into port 24 and thence to the right hand end of the cylinder 13. Under these conditions, the admission of pressure to the right hand end of the cylinder causes the piston 14 to move to the left and piston movement in this direction also carries the valve back again to the "neutral" position (the position shown in Figure 4) in which ports 22 and 24 are again closed.

A similar sequence of steps takes place in the event of adjustment to move the piston 14 to the right, and it will be seen that by this arrangement the fluid pressure in opposite ends of cylinder 13 serves to maintain the reverse gear in any desired position of adjustment. In the event of leakage of pressure from either end of the cylinder, this leakage would result in a movement of the piston toward that end of the cylinder at which the leakage occurs, and if this movement is continued to any appreciable extent, the valve 26 will be moved sufficiently to uncover the admission port leading to the end of the cylinder toward which the piston is moving. The uncovering of this admission port will again restore the balance between the fluid pressure at opposite ends of the cylinder.

At each side of the locomotive the tumbling shaft is provided with a bearing which is preferably of the split type, the block being indicated by 5 and the cooperating cap by 6. These bearings may be secured to any suitable form of bracket, as indicated at 7 which in turn is secured to the locomotive frame. The bearings are secured together by bolts 8 which are threaded at both ends and which are provided with shoulders 9. The lower and smaller portions of the bolts extend through apertures in the block 5 and bracket 7, the shoulders 9 abutting against the top of the block 5, and nuts 10 serve to secure the block to the bracket 7 independently of the bearing cap member 6. The bolts 8 extend well above the cap 6 and are provided with nuts 11. Springs 12 are provided between these nuts and the top of the cap member 6 and serve to retain this member adjacent the tumbling shaft.

The bearing cavities of the members 5 and 6 are lined with some suitable lining material 13 having a relatively high coefficient of friction such, for example, as treated asbestos.

When a locomotive is running at speed the movements of the valve gear frequently have a tendency to cause the reverse gear to creep, and the valve gear's movements also tend to set up short reciprocations of the reverse gear which result in rapid wear of the moving parts. Many attempts have been made to overcome these difficulties, among which are the provision of locks of various kinds, which are obviously inconvenient, and frictional packings or elements on some working part of the reverse gear itself. This latter type of arrangement has not proven satisfactory as, at times, the pressures in the reverse gear change and that on one side of the gear builds up until it acquires sufficient force to overcome the resistance of the friction means in the gear at which time the gear jumps a sufficient distance to again equalize the pressures. In many instances gears of this type have received shocks of sufficient force to tear them from their moorings on the locomotive.

We overcome the foregoing disadvantages by the provision of frictional bearings in the operative connection between the reverse and valve gears, i. e.—on the tumbling shaft. These frictional bearings act to absorb the vibration which is set up by the rapid oscillation of the valve gear when the locomotive is running at speed and thus prevent such movements from accumulating and being carried back to the reverse gear and causing the gear to creep or move from its set position. The resistance, of course, is not sufficient to impair quick action in changing the cut-off.

We claim:—

1. In a locomotive the combination of a valve gear mechanism; a reverse gear mechanism including a reciprocating element reciprocated by power fluid to adjust said valve gear mechanism and reversible by power fluid to reverse the direction of operation of said locomotive, said element being elastically held in adjusted position by said power fluid; a pair of members pivotally connected together, one of said members being pivotally connected to a fixed part of said locomotive, one of said members being pivotally connected with said valve gear mechanism, and the other of said members being pivotally connected with said power fluid actuated element, whereby shocks from said valve gear mechanism will be transmitted, by change in angularity of the respective pivotal connections, to said power fluid actuated element to displace said power fluid actuated element; and a friction device associated with one of said pivotal connections to resist said change in said angularity to minimize the displacement of said power fluid actuated element by said shocks.

2. In a locomotive, the combination of a valve gear, a fluid pressure operated reverse gear including a reciprocating element adapted to be held in adjusted position by fluid pressure, mechanism for interconnecting said element and the valve gear to provide for adjustment of the valve gear setting by actuation of the reverse gear, said mechanism including a connection member and a pivot for the member at which the member has movement when the reverse gear is actuated, but the position of which member is adapted to be elastically maintained by the reverse gear with a given setting thereof, and a friction device associated with said pivot for resisting movement of said member, the frictional reaction of said device being sufficient to substantially restrain transmission, through said mechanism, of movements of the valve gear to said element, but insufficient to restrain movements of said mechanism by actuation of the reverse gear.

3. In a locomotive the combination of a valve gear, a fluid pressure operated reverse gear, an operative connection between said gears whereby the former may be set by actuation of the latter, said connection including a rotatable shaft, a supporting bearing for said shaft, and a constantly operative friction device associated with said bearing and reacting against said shaft, the frictional reaction being sufficient to restrain creeping of the reverse gear under the influence of movements of the valve gear but insufficient to prevent setting of the valve gear by actuation of the reverse gear.

4. In a locomotive the combination of a valve gear, a fluid pressure operated reverse gear, a tumbling shaft, a connection between the valve gear and said shaft, a connection between the reverse gear and said shaft, a supporting bearing for said shaft, and a friction lining in said bearing reacting against said shaft, the frictional engagement of the shaft and the bearing lining being sufficient to restrain creeping of the reverse gear but insufficient to prevent setting of the valve gear by actuation of the reverse gear.

5. In a locomotive the combination of a valve gear, a fluid pressure operated reverse gear, a tumbling shaft, a connection between the valve gear and said shaft, a connection between the reverse gear and said shaft, a supporting bearing for said shaft including a plurality of bearing parts, resilient means for urging said parts toward each other, and a friction lining associated with at least one of said parts and reacting against said shaft under the influence of the resilient means, the frictional reaction being sufficient to restrain creeping of the reverse gear but insufficient to prevent setting of the valve gear by actuation of the reverse gear.

6. In a locomotive the combination of a valve gear, a fluid pressure operated reverse gear, a tumbling shaft, a connection between the valve gear and said shaft, a connection between the reverse gear and said shaft, and a friction device reacting against said shaft, the frictional reaction being sufficient to restrain creeping of the reverse gear under the influence of valve gear movements but insufficient to prevent setting of the valve gear by actuation of the reverse gear.

7. In a locomotive, the combination of a valve gear, a fluid pressure operated reverse gear including a reciprocating element adapted to be held in adjusted position by fluid pressure, mechanism for interconnecting said element and the valve gear to provide for adjustment of the valve gear setting by actuation of the reverse gear, said mechanism including a connection member and a pivot for the member coupling it to a fixed part of the locomotive, at which pivot the member has movement when the reverse gear is actuated but the position of which member is adapted to be elastically maintained by the reverse gear with a given setting thereof, and a friction device associated with said pivot for resisting movement of said member, the frictional reaction of said device being sufficient to substantially restrain transmission, through said mechanism, of movements of the valve gear to said element, but insufficient to restrain movements of said mechanism by actuation of the reverse gear.

8. In a locomotive, the combination of a valve gear, a fluid pressure operated reverse gear including a reciprocating element adapted to be held in adjusted position by fluid pressure, mechanism for interconnecting said element and the valve gear to provide for adjustment of the valve gear setting by actuation of the reverse gear, said mechanism including a connection member and a pivot for the member at which the member has movement when the reverse gear is actuated, but the position of which member is adapted to be elastically maintained by the reverse gear with a given setting thereof, a friction device associated with said pivot for resisting movement of said member, the frictional reaction of said device being sufficient to substantially restrain transmission, through said mechanism, of movements of the valve gear to said element, but insufficient to restrain movements of said mechanism by actuation of the reverse gear, and means for adjusting the frictional reaction of said device.

EDWIN DE H. CALDWELL.
LAWRENCE S. WILBUR.